United States Patent [19]
Honma

[11] Patent Number: 5,295,660
[45] Date of Patent: Mar. 22, 1994

[54] METAL DIAPHRAGM VALVE WITH LOCK MECHANISM

[75] Inventor: Katsuhiko Honma, Yabutsukahonmachi, Japan

[73] Assignee: Benkan Corporation, Tokyo, Japan

[21] Appl. No.: 100,429

[22] Filed: Aug. 2, 1993

[30] Foreign Application Priority Data

Nov. 12, 1992 [JP] Japan .................................. 4-84259

[51] Int. Cl.$^5$ .................. F16K 31/00; F16K 51/00
[52] U.S. Cl. .................... 251/297; 251/332; 251/288
[58] Field of Search ............... 251/288, 297, 331

[56] References Cited

U.S. PATENT DOCUMENTS

| | | | |
|---|---|---|---|
| 2,944,568 | 7/1960 | Jonson | 251/297 |
| 2,994,341 | 8/1961 | Leopold, Jr. et al. | 251/288 |
| 4,572,477 | 2/1986 | Philpot et al. | 251/288 |
| 4,643,215 | 2/1987 | Philpot et al. | 251/297 |
| 5,112,027 | 5/1992 | Hannyu et al. | 251/331 |

FOREIGN PATENT DOCUMENTS 0115970  5/1988  Japan .................................. 251/331

*Primary Examiner*—A. Michael Chambers
*Attorney, Agent, or Firm*—Eric P. Schellin

[57] ABSTRACT

A metal diaphragm valve is disclosed, which has an improved locking mechanism capable of locking the valve in closed position. The mechanism comprises a roller that is snugly disposed in a cutout formed in the bonnet made integral with the knob which drives the diaphragm through a reciprocating plunger. The roller is made rotatable on a horizontal plane with the bonnet which is in turn turned by the knob. When the knob is turned, for an angle of 90 degrees, from the fully-opened position of the valve to the fully-closed position, the roller slips into a groove formed in a stationary member provided in the bonnet. When the roller fits into the groove, the operator can tactically feel the drop and hear a clicking sound, confirming that the valve is closed.

1 Claim, 5 Drawing Sheets

METAL DIAPHRAGM VALVE WITH LOCK MECHANISM

BACKGROUND OF THE INVENTION

1) Field of the Invention

This invention relates in general to a metal diaphragm valve which is widely used in the fluid pipings for semiconductor manufacturing equipment, and in more particular to such a device with safety means which can lock the valve in closed position.

2) Description of the Prior Art

A number of metal diaphragm valves with lock mechanism is widely used, which are capable of holding the valve in closed position. Of those conventional valves is mostly known the type which has a largely diamond-shaped knob to regulate the diaphragm for improved performance. It is so designed that the rotation of the knob is converted to a vertical reciprocation in a plunger that moves the diaphragm into contact with or away from a valve seat, thereby regulate the flow of fluid through the diaphragm.

With respect to FIGS. 4 and 5, which illustrate such a valve 23, a knob 21 is made rotatable on a horizontal plane between a first position where the valve is fully opened and a second position where the valve is fully opened. The first and second positions may be spaced by a rotational angle of 90 degrees. The flow of fluid through the diaphragm is precisely regulated by turning the knob 21 for a specific angle of degree between the first and second positions. The conventional locking mechanisms for these valves normally comprise a pair of stoppers 18 and a stopper pin 19 movable between the stoppers.

It is noted, however, that the prior-art lock mechanisms have difficulties in that the knob 21, when not fully turned to the closed position, tends to accidentally rotate by a casual touch of a hand or an object that happens to come near it. The diaphragm unwontedly lifts off from the valve seat to allow flow of the fluid, resulting in an serious accident.

SUMMARY OF THE INVENTION

It is therefore a primary object of the present invention to provide a metal diaphragm valve having an improved lock mechanism to prevent accidental unwanted opening of the valve which is free from the above-mentioned drawback of conventional devices.

The above advantage of the invention is provided by a mechanism comprising a roller snugly disposed in a cutout formed in the bonnet made integral with the knob which drives the diaphragm through a reciprocating plunger. The roller is made rotatable on a horizontal plane together with the bonnet which in turns is turned by the knob. When the knob is turned from the fully-opened position of the valve to the fully-closed position, the roller slips into a groove formed in a stationary member provided in the bonnet. When the roller fits into the groove, the operator can tactically feel the drop and hear a clicking sound, confirming that the valve is closed.

BRIEF EXPLANATION OF THE ACCOMPANYING DRAWINGS

DETAILED DESCRIPTION OF THE PREFERRED EMBODIMENTS

A preferred embodiment of the metal diaphragm valve according to the present invention will be described in full detail in conjunction with the attached drawings.

Figure 1:
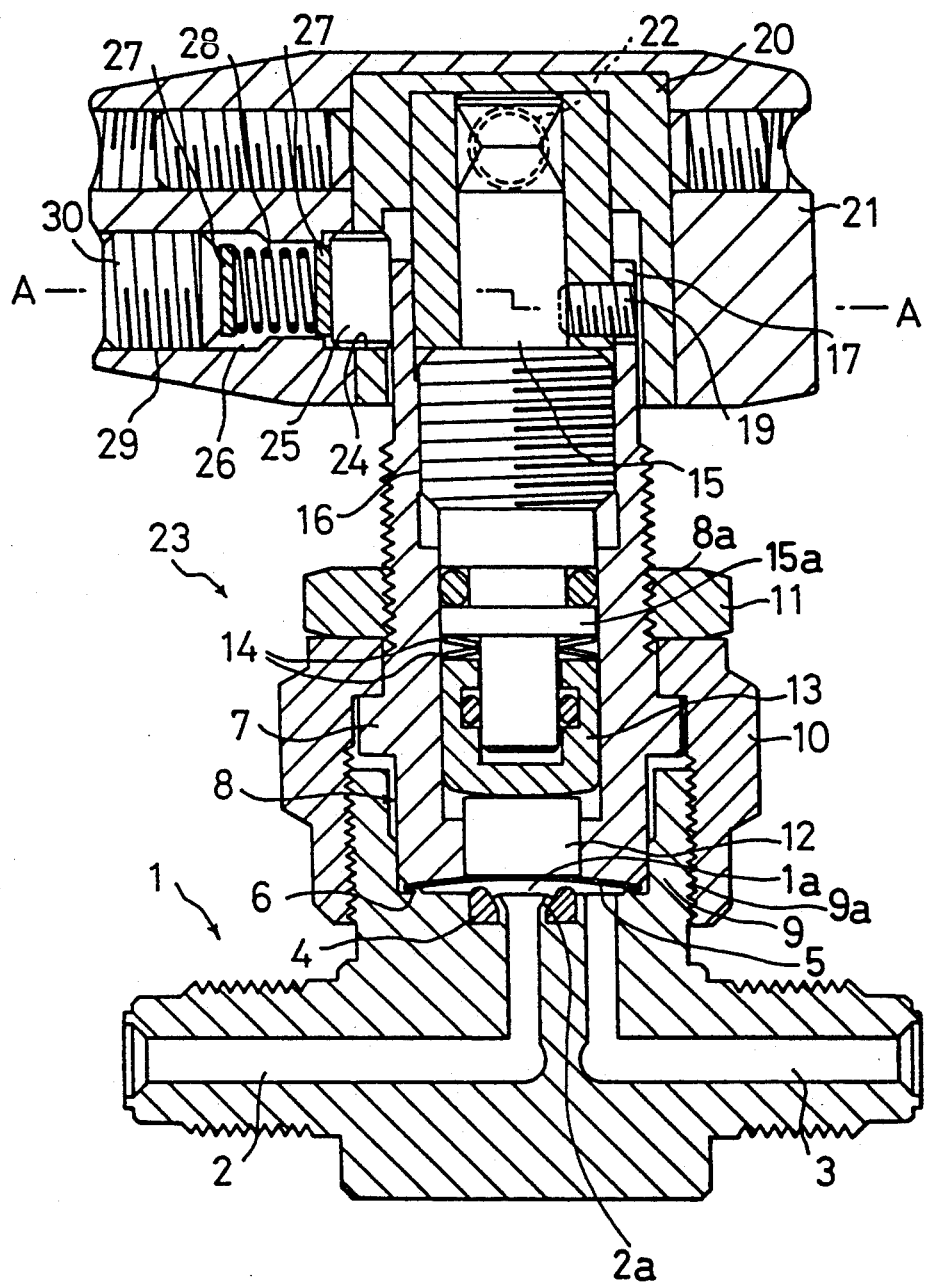
FIG. 1 is a vertical cross-sectional schematic view of a preferred embodiment of the manually-operated metal diaphragm valve having a locking mechanism constructed in accordance with the present invention, showing that the valve is in the fully-opened position.

Referring to FIG. 1, the valve 23 includes a valve casing 1 having a fluid inlet passage 2 centrally mounted and a fluid outlet passage 3 provided on one side of the casing. The inlet passage 2 has at one end thereof an inlet opening 2a which opens into a cylindrical space 1a. An annular valve seat 4 is mounted to surround the inlet opening 2a. Opposite the valve seat 4 is disposed a circular diaphragm 5 made of an elastic metal material that is supported along an outer periphery thereof by a serration portion 6.

The valve 23 also includes a vertically extending cylindrical hollow bonnet 8 having at a lower end thereof a flange 7 to press the metal diaphragm 5 against the serration portion 6. A tubular shroud 10 is provided to brace a vertical sleeve 9 that extends upward from the casing 1 past the diaphragm. The shroud 10 may be internally threaded to engage with an external threaded portion 9a of the vertical sleeve. The bonnet 8 is tightly secured in position by the shroud 10 and the sleeve 9.

A lock nut 11 is engaged with an externally threaded portion 8a of the bonnet 8 to fixedly secure the shroud 10 in place. A diaphragm pusher 12 is slidably disposed in the hollow bonnet 8 at a lower end thereof, and contacted against the diaphragm 5. A cup-shaped spindle cap 13 is vertically movably disposed in the bonnet 8 on top of the pusher 12, and is operatively linked to a reciprocating cylindrical spindle 15 via a dished spring 14 that is interposed between the spindle cap and a boss 15a formed at a lower end of the spindle.

The spindle 15 has an externally threaded portion to engage with an internal thread 16 that is formed at an upper portion of the hollow bonnet 8. The spindle 15 has a lower end thereof inserted into the cup of the spindle cap 13. The spindle 15 is provided to move in vertical direction to drive the diaphragm pusher 12 through the spindle cap 13, thereby moving the diaphragm 5 into contact with or away from the valve seat 4. Also, in an upper portion of the valve 23, the bonnet 8 is formed, along an upper circumferential part thereof, with a horizontal arcuate groove 17 cut through an angle of 90 degrees, as is best shown in FIG. 2, in which is disposed a horizontal stopper pin 19.

The stopper pin 19, and one end thereof, is fixedly secured to a hollow inner collar 20 that is braced by a knob 21. The other end of the pin 19 is engaged to an upper end of the spindle 15. The stopper pin 19 is turned on a horizontal plane by rotating the knob 21. The knob 21 is made integral with the inner collar 20 for joined movement with a screw 22, and is made rotatable on a horizontal plane between stoppers 18 (FIG. 2) defined by both ends of the arcuate groove 17. With this arrangement, the rotation of the knob 21 is converted to a vertical reciprocation of the spindle 15, thereby controlling the movement of the diaphragm 5 relative to the valve seat 4. The rotation of the knob 21, and hence the movement of the diaphragm 5 is limited by the rotatable stopper pin 19 between the stoppers 18.

Figure 2:
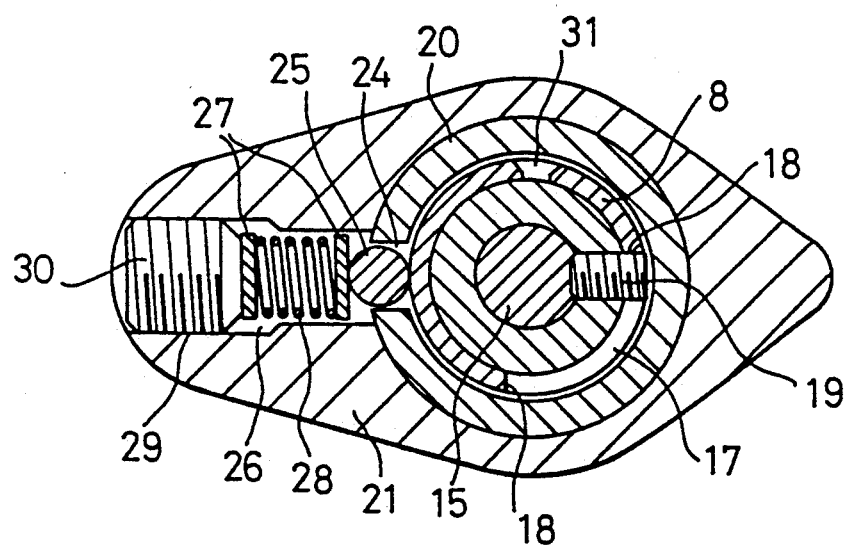
FIG. 2 is a horizontal cross-sectional schematic view of the valve, taken along plane A—A of FIG. 1.

A vertical cutout 24 is formed in the inner collar 20 at a periphery largely opposite the stopper pin 19, as is best shown in FIG. 2. A roller 25 is disposed snugly in the cutout 24 for movement around the bonnet 8 with the turning of the collar. A compression spring 28 is inserted in a horizontal hole 26 that is drilled in the knob 21 at the opposite side to the stopper pin 19. The spring 28 with a both spring collar 27 is abutted at a rear end thereof against a screw 30 that is engaged with an internally threaded end portion 29 of the horizontal hole 26, and is engaged at the other end with the roller 25, which is urged by the spring 28 toward an upper circumference of the bonnet 8.

A vertical groove 31 is formed in an upper part of the bonnet 8 and is cut large enough to house therein the roller 25. The groove 31 is situated in the circumference of the bonnet 8 such that the roller, which is snugly placed in the cutout 24 just slips into the groove 31 when the collar, moved by the knob 21, is rotated through an angle of 90 degrees. This 90-degree rotation of the knob 21 closes the valve 23 by driving the diaphragm 5 into contact with the valve seat 4 through the spindle 15. The groove 31 is preferably beveled at both lateral sides (FIG. 2) enough to enable the roller 25 to move out of it when the knob 21 is rotated back again to pull the diaphragm 5 away from the valve seat 4 to open the valve 23.

The operation of the metal diaphragm valve 23 with lock mechanism according to this invention will be described with respect to FIGS. 1 and 2, in which the valve is in its opened condition. When the knob 21 is rotated manually through an angle of 90 degrees to the position depicted in FIG. 3, the spindle 15 coupled to the knob with the screw 22 is also turned through the same angle, bringing down the bonnet 8 downward. The downward slide of the bonnet 8 depress the pusher 12, forcing the diaphragm into contact with the valve seat 4. Further rotation of the knob 21 is prevented by the stopper pin 19 by one of the stoppers 18 defined in the arcuate groove 17.

Figure 3:
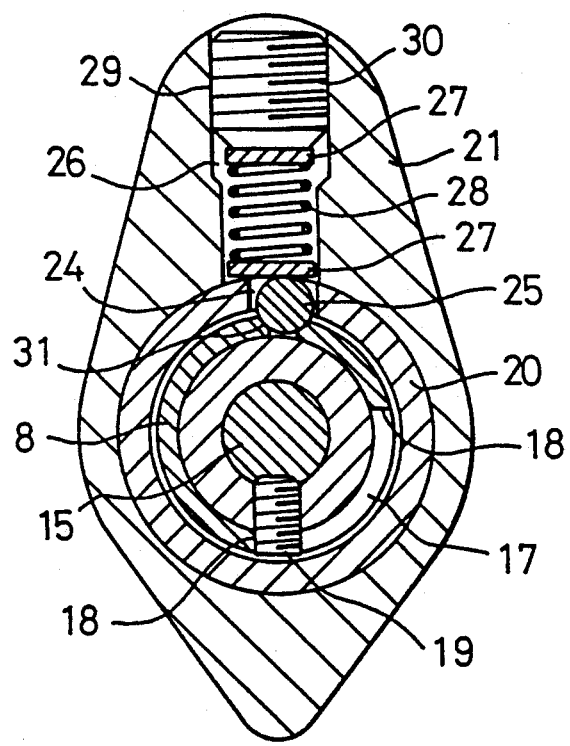
FIG. 3 is a horizontal cross-sectional schematic view of the embodiment of FIG. 1 in which the valve is in the fully-closed position.
Figure 4:
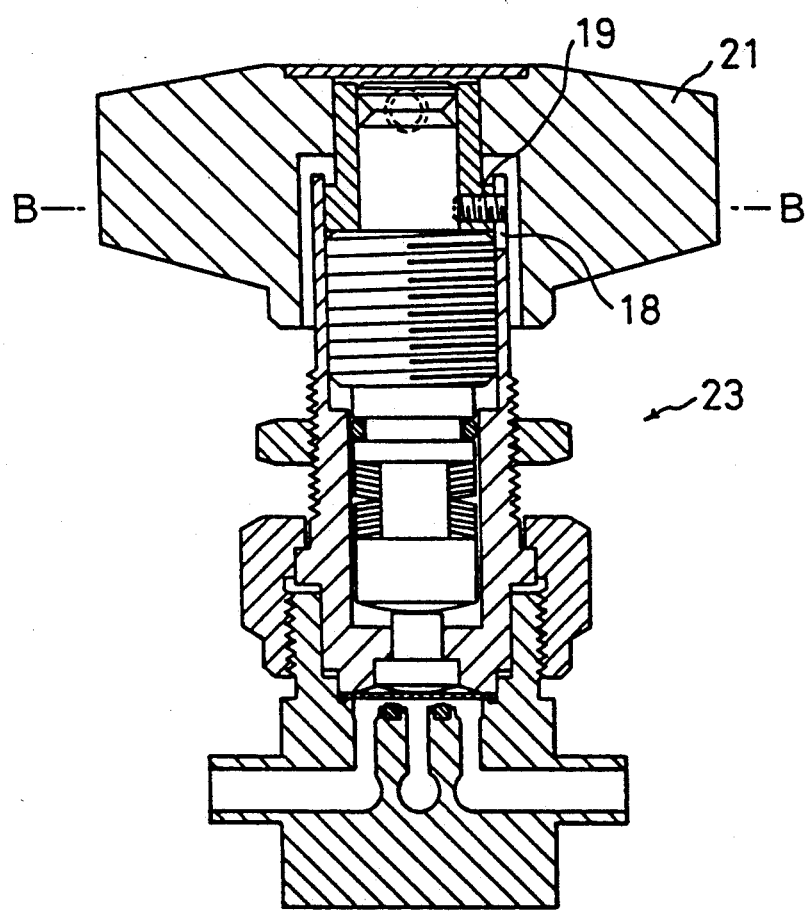
FIG. 4 is a vertical cross-sectional schematic view of a conventional manual metal diaphragm valve.
Figure 5:
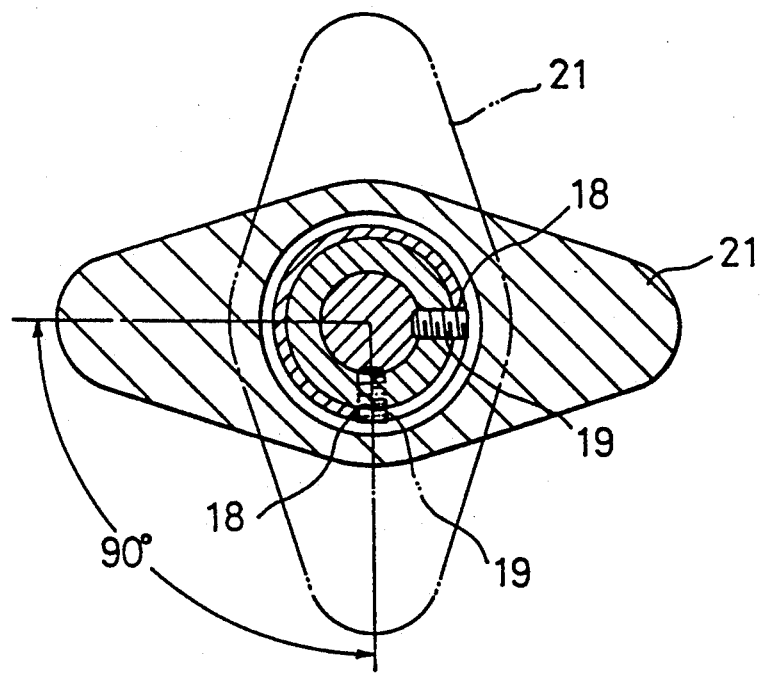
FIG. 5 is a horizontal cross-sectional schematic view of the prior art valve, taken along plane B—B of FIG. 4.

At the moment the knob 21 is turned to its full-rotated position, as illustrated in FIG. 3, the roller 25 slips out of the cutout 24 of the inner collar 20 into the vertical groove 31 defined in the bonnet 8, generating a tactical sense of the sag in the operator's hand, along with a clicking sound, to give enough assurance that the valve 23 is correctly closed.

When the roller 25 is fitted into the groove 31, the spring 28 acts to exert pressure on the roller 25 and locks it in fixed position in the groove. The spring pressure is selected such that intended manual force has to be sued to rotate the knob 21 back to the position depicted by FIG. 2, to pull the roller 25 out of the groove 24 and bring the valve 23 to open position. This lock mechanism is provided to prevent accidental turning of the knob 21 out of its closed position.

Thus, the lock mechanism of this invention helps a valve operator to perfectly acknowledge whether the valve 23 is opened or closed, and prevents unwanted operation of the valve through careless or chance tough of the knob 21, enhancing the safety and reliability of the valve system.

In this particular embodiment, the inlet passage 2 is centrally situated, with the outlet passage 3 being mounted off center. However, this design is a matter of choice and the positions of the passages can be interchangeable.

What is claimed is:

1. A lock mechanism for metal diaphragm valves having a valve casing housing an annular valve seat, a circular diaphragm made of an elastic metal material to regulate fluid flow with the valve seat, and a pair of inlet and outlet formed below the diaphragm and through which the fluid flows, a cylindrical hollow bonnet vertically extending above the casing and overlaying the diaphragm, the bonnet being secured in fixed position and made integral with a stationary shroud fixedly mounted on top of the casing, a vertically slidably disposed spindle housed in the bonnet, a cup-shaped reciprocating valve pusher clamped by a lower end of the bonnet and operatively coupled to the spindle, the pusher being adapted to drive the diaphragm into contact with or away from the valve seat, an inner collar provided in an upper end of the bonnet and made integral with a knob which is rotatable on a horizontal plane between a first position and a second position, the spindle being operatively coupled to the knob in which rotating the knob to the first position brings the diaphragm into contact the valve seat through the spindle and turning back to the second position drives the diaphragm away from the seat.

comprising a roller provided snugly inserted in a cutout formed in the inner collar for rotation with the collar when the knob is turned, a vertical groove provided in the stationary bonnet, the groove being formed to receive therein the roller when the knob is rotated from the second position to the first position, and a compression spring provided in the knob, the spring being engaged at one end thereof with the roller and adapted to press the roller into the groove.

* * * * *